(12) United States Patent
Gross (10) Patent No.: US 11,073,182 B2
(45) Date of Patent: Jul. 27, 2021

(54) VISCOUS COUPLING FOR A COOLANT PUMP

(71) Applicant: Mahle International GmbH, Stuttgart (DE)

(72) Inventor: Martin Gross, Ersingen (DE)

(73) Assignee: Mahle International GmbH

( * ) Notice: Subject to any disclaimer, the term of this patent is extended or adjusted under 35 U.S.C. 154(b) by 220 days.

(21) Appl. No.: 16/085,823

(22) PCT Filed: Mar. 16, 2017

(86) PCT No.: PCT/EP2017/056271
§ 371 (c)(1),
(2) Date: Sep. 17, 2018

(87) PCT Pub. No.: WO2017/158109
PCT Pub. Date: Sep. 21, 2017

(65) Prior Publication Data
US 2019/0048945 A1 Feb. 14, 2019
US 2020/0182309 A9 Jun. 11, 2020

(30) Foreign Application Priority Data

Mar. 18, 2016 (DE) .......................... 102016204574.1

(51) Int. Cl.
*F16D 35/02* (2006.01)
*F16D 47/06* (2006.01)
(Continued)

(52) U.S. Cl.
CPC ......... *F16D 35/024* (2013.01); *F04D 13/022* (2013.01); *F04D 13/16* (2013.01);
(Continued)

(58) Field of Classification Search
CPC .... F16D 35/024; F16D 35/027; F16D 35/028; F16D 35/029; F04D 13/022;
(Continued)

(56) References Cited

U.S. PATENT DOCUMENTS 3,749,214 A * 7/1973 Leichliter ............... F16D 35/02
192/58.4
5,775,583 A * 7/1998 Braatz ...................... B60H 1/14
237/12.3 B
(Continued)

FOREIGN PATENT DOCUMENTS

DE 102010043264 A1 5/2012
EP 1566526 A2 8/2005
(Continued)

OTHER PUBLICATIONS

English abstract for DE-102010043264.
(Continued)

*Primary Examiner* — Bryan M Lettman
*Assistant Examiner* — Timothy P Solak
(74) *Attorney, Agent, or Firm* — Fishman Stewart PLLC (57) ABSTRACT

A viscous coupling may include: a housing part and an input body rotatable relative to the housing part that at least partially delimit an interior space; a shaft rotatable relative to the housing part and on which an output body arranged in the interior space may be formed for conjoint rotation with the shaft; a coupling region formed between the output and input bodies and configured to hold a viscous fluid to assure a coupling between the input body and the output body; a holding chamber for collecting coolant leaking from the coolant pump; a housing wall conformed integrally with the housing part and partially delimiting the holding chamber; and an actuator housing and an electric actuator therein by which a degree of the coupling between the input body and
(Continued)

the output body may be adjustable. The actuator housing may at least partially cover the holding chamber.

19 Claims, 9 Drawing Sheets

(51) Int. Cl.
*F04D 29/08* (2006.01)
*F04D 29/40* (2006.01)
*F04D 13/02* (2006.01)
*F04D 13/16* (2006.01)
*F04D 15/00* (2006.01)
*F04D 29/02* (2006.01)
*F04D 29/044* (2006.01)

(52) U.S. Cl.
CPC ....... *F04D 15/0027* (2013.01); *F04D 29/086* (2013.01); *F04D 29/406* (2013.01); *F16D 47/06* (2013.01); *F04D 15/0005* (2013.01); *F04D 29/026* (2013.01); *F04D 29/044* (2013.01)

(58) Field of Classification Search
CPC ............. F04D 15/0005; F04D 15/0027; F04D 29/007; F04D 29/0405; F04D 29/2261; F04D 29/40; F04D 29/42; F04D 29/62
See application file for complete search history.

(56) References Cited

U.S. PATENT DOCUMENTS

| | | | | |
|---|---|---|---|---|
| 6,021,747 | A * | 2/2000 | Gee | F16D 35/024 123/41.11 |
| 6,491,149 | B1 * | 12/2002 | Kundermann | F16D 21/06 192/48.619 |
| 6,561,141 | B2 * | 5/2003 | Stretch | F16D 37/008 123/41.12 |
| 7,828,529 | B2 | 11/2010 | Baumgartner et al. | |
| 2005/0210875 | A1 * | 9/2005 | Larue | F16C 17/024 60/602 |
| 2010/0059325 | A1 * | 3/2010 | Boyer | F16D 48/064 192/58.61 |

FOREIGN PATENT DOCUMENTS

| | | |
|---|---|---|
| EP | 2947345 A1 | 11/2015 |
| JP | H051728 A | 1/1993 |
| WO | 2014047430 A1 | 3/2014 |

OTHER PUBLICATIONS

Schultheiss G et al. "Visco-Wasserpumpe Bedarfshbhaengige Regelung Der Foerdermenge", MTZ Motortechnische Zeitschrift, Springer, vol. 73, No. 3 Mar. 1, 2012; pp. 226-231.

* cited by examiner

VISCOUS COUPLING FOR A COOLANT PUMP

CROSS REFERENCE TO RELATED APPLICATIONS

This application claims priority to International Patent Application No. PCT/EP2017/056271, filed on Mar. 16, 2017, and German Patent Application No. DE 10 2016 204 574.1, filed on Mar. 18, 2016, the contents of both of which are hereby incorporated by reference in their entirety.

TECHNICAL FIELD

The invention relates to a viscous coupling for a coolant pump and a coolant pump having such as viscous coupling.

BACKGROUND

A viscous coupling, also called a viscocoupling, has an input body and an output body, which are coupled to each other via a viscous fluid. The rotation of the input body is transferred to the output body due to the viscosity or fluid friction of the fluid present between the two bodies. Such a drive coupling between the two bodies is typically formed in a specially designed coupling region of the coupling, in which the two bodies are arranged close to each other. In such an arrangement, the viscous fluid is accommodated in a space between the two bodies.

Viscous couplings of such kind are often used to transport coolant in coolant pumps. To do this, a pump impeller for circulating the coolant is typically arranged on a shaft of the viscous coupling, which shaft is mounted rotatably on the housing of the viscous coupling by means of a ring bearing or similar. The degree of coupling between input body and output body can then be adjusted with the aid of an electric actuator, which in turn actuates a valve. The valve serves to adjust the quantity of fluid that is introduced into the coupling region and therewith also a degree of coupling between the bodies. The electric actuator may include an electric coil whose magnetic field is able to actuate a valve body of said valve by reciprocal magnetic action.

Such a viscous coupling is known from EP 1 566 526 A2, for example.

In order to prevent the coolant—for example coolant water—circulated by the coolant pump from leaking into the region between the shaft and the ring bearing and damaging the bearing, a sealing means in the form of a slide ring seal or similar is provided between the housing part and the shaft. As a rule, conventional viscous couplings also include a holding chamber in which coolant that has leaked past the slide ring seal can be held and collected. In known viscous couplings, a conventional holding chamber of such kind is embodied as a kind of reservoir which is sealed with a cover. However, providing such a receptacle with cover, which can be attached thereto by caulking, bolting or roller burnishing, involves much technical effort.

SUMMARY

It is therefore an object of the present invention to describe new approaches to the development of viscous couplings, in particular with a view to making the simplest possible construction.

This object is solved with the subject matter of the independent claims. Preferred embodiments are the subject matter of the dependent claims.

Accordingly, the basic idea of the invention consists of forming a holding chamber for leaking coolant integrally with the viscous coupling housing part on which the shaft of the coupling is mounted rotatably, and sealing the holding chamber with an actuator housing in which the electric actuator is provided for controlling the degree of coupling provided by the coupling. In the case of the viscous coupling according to the invention, the actuator housing thus no longer serves to accommodate an electric actuator, but instead functions additionally as a cover as well for sealing off the holding chamber. The provision of a separate cover for sealing the holding chamber may therefore be dispensed with in the viscous coupling presented here. The consequence of this is a simpler structural design of the viscous coupling, which in turn entails reduced manufacturing costs and greater configuration freedom in the design engineering of the coupling. The solution suggested here also enables holding chambers of relatively large volume to be created, thereby avoiding the need for a technician to make unnecessary, incorrect expansions due to leakage from the completely filled holding chamber. Finally, any existing excess leakage can be atomised by the base body.

A viscous coupling for a coolant pump according to the invention comprises a housing part and an input body which is rotatable relative to said housing part. The housing part and the input body together at least partially define an interior space of the viscous coupling. A shaft is provided which is rotatable relative to the housing part and on which an output body is formed that is rotatable conjointly therewith. Said output body is arranged in the interior space. A coupling region is formed between the output body and the input body, in which a viscous fluid is accommodated to provide a torque coupling between the input body and the output body. A holding chamber is also provided which serves to accommodate cooling which leaks from the coolant pump.

According to the invention, a housing wall is formed integrally on the housing part and partially delimits the holding chamber. In order to delimit the holding chamber, an actuator housing is also present, which an electric actuator is provided. A degree of coupling between the input body and the output body may be adjusted by means of the actuator. The actuator housing axially partially covers the holding chamber, which is delimited by the housing wall.

In a preferred embodiment, the housing part has the form of a housing plate which delimits the interior space in the axial direction of the shaft: In this variant, the housing wall protrudes from the housing plate in the axial direction of the shaft as far as the input body in such a way that forms the radially outer limit of the holding chamber. In this variant, the holding chamber occupies particularly little installation space in the axial direction.

In an advantageous development, the housing part has an opening which the shaft of the viscous coupling passes through. In this further development, a bearing collar surrounding the opening, and on which the shaft is mounted rotatably protrudes in the axial direction of the shaft from the housing part, particularly from the housing plate. Said bearing collar forms the radially inner limit of the holding chamber. In this variant too, the holding chamber occupies particularly little installation space in the axial direction.

In another advantageous further development, a first through hole is provided in the housing wall to function as an external venting means. A second through hole is also provided in the bearing collar to function as an internal venting means. The venting means serve to effectively vent vapour leaks in the area of the aforementioned slide ring seal between the shaft and the housing part.

Particularly preferably, an extension protruding in the axial direction is formed on the actuator housing and closes the first through hole. This feature prevents rainwater or cleaning fluid from getting into the holding chamber from the outside while the viscous coupling is in operation.

Viewed from above along the axial direction of the shaft, the actuator housing is advantageously substantially ring-shaped with a through hole through which the shaft passes. The electric actuator located in the actuator housing comprises an electric coil the winding of which extends circumferentially around the through hole. Such an annular actuator housing is particularly easy to manufacture, resulting in not inconsiderable cost advantages.

In another preferred embodiment, a sealing structure is formed on a side of the actuator housing facing the housing part to seal the holding chamber from the external environment. In this way, a highly effective seal of the holding chamber may be guaranteed against the external environment.

In an advantageous further development, the sealing structure has the same contour in a cross section perpendicular to the axial direction as the contour of the housing wall that protrudes axially from the housing part.

The housing wall advantageously has a first wall section whose cross section perpendicular to the axial direction has the geometry of a circle segment. A second wall section, which complements the first wall section to form the housing wall, is curved. With such a geometry it is possible to hold a large quantity of leaked coolant while at the same time occupying little installation space in the axial direction. Moreover, this geometry makes it easier to attach the actuator housing with the actuator to the valve controller close to the valve lever of the valve assembly.

In another preferred embodiment, the input body is constructed in at least two parts and comprises a pot-shaped base body and a cover. The base body is arranged along the axial direction between the housing part and the cover. Said cover may be mounted on the base body and then closes off the base body. In this variant, the cover is fastened detachably to the base body by a threaded connection. For this purpose, an external thread is conformed on the cover. An internal thread is provided on the base body to mate with this external thread. The cover may be screwed into the base body with the aid of the two threads.

A further preferred embodiment, in which the cover is made from aluminium and base body made from a steel entails particularly low manufacturing costs.

In a further advantageous refinement, a sheave is arranged on the cover, preferably via a threaded connection, for conjoint rotation therewith, to transfer an external turning moment radially outwards to the base body. Alternatively thereto, such a sheave may also be conformed radially outwardly on the base body. Both alternatives allow simple coupling of an external turning moment with the viscous coupling.

In another advantageous further development, a magnetic insulator made from a steel, particularly a stainless steel, is arranged on a pot bottom of the pot-shaped base body and extends circumferentially around the pot bottom. This magnetic insulator, which is preferably embodied as an insulating ring, that is to say it has an annular geometry, divides the pot bottom into a radially inner and a radially outer bottom part, and is connected to the radially outer and radially inner bottom parts by means of a laser weld joint.

The magnetic insulator may particularly advantageously be a deep-drawn sheet metal formed part or a component turned from a blank. Such a sheet metal formed part is particularly simple to manufacture and may thus be produced with particularly low manufacturing costs.

In a further advantageous refinement, a load relieving groove runs round the entire circumference inside the magnetic insulator. Such a load relieving groove may help to minimise the occurrence of undesirable thermomechanical stresses in the base body.

According to another preferred embodiment, the housing wall is designed as a peripheral wall. The cross section of the housing wall perpendicular to the axial direction preferably has a round, most preferably circular geometry. A circular geometry is particularly preferred.

In an advantageous further development, the housing wall in the form of a peripheral wall extends fully around the circumference of the holding chamber.

In a further preferred embodiment, a rib structure comprising ribs protrudes from the housing part, preferably from the housing plate, in the axial direction. In this embodiment, the housing wall, particularly the peripheral wall is arranged between ribs. These ribs may preferably be two circumferentially adjacent ribs. Alternative, the rib structure may also form a part of the housing wall. This variant occupies particularly little installation space.

According to another preferred embodiment, the sealing structure may be sprayed onto the actuator housing. This embodiment entails particularly low manufacturing costs for the sealing structure.

According to another preferred embodiment, the sealing structure is embodied as a sealing ring, particularly as an O-ring made from an elastic material or as a sealing plug. In this embodiment it is possible to replace the sealing ring with a spare part, which may be necessary for example if the sealing effect begins to deteriorate as a result of wear.

The invention further relates to a coolant pump having a viscous coupling as presented earlier in this document. A plurality of moving blades are conformed on the shaft of the viscous coupling for circulating a coolant. The aforementioned advantages of the viscous coupling are thus also transferred to the coolant pump according to the invention.

The aforementioned advantages of the viscous coupling are thus also transferred to the pump device according to the invention.

Further important features and advantages of the invention are described in the subclaims, the drawing and the associated description of the figures with reference to the drawing.

Of course, the features described in the preceding text and those which will be explained subsequently are usable not only in the combinations indicated, but also in other combinations or as stand-alone solutions without departing from the scope of the present invention.

Preferred embodiments of the invention are represented in the drawing and will be explained in greater detail in the following description, wherein the same reference signs refer to identical or similar or functionally equivalent components.

BRIEF DESCRIPTION OF THE DRAWINGS

In the drawing, the schematic figures show:

FIG. 1 a longitudinal cross section through an example of a viscous coupling according to the invention, FIG. 2 a perspective view of the viscous coupling of FIG. 1, FIG. 3 a separate, perspective view of a cover of the viscous coupling, FIG. 4 a separate, perspective view of a base body of the viscous coupling, FIG. 5 the cover shown in FIG. 3 and the base body 7 shown in FIG. 4 in a mounted state on the housing part of the viscous coupling, FIG. 6 a further development of FIG. 5 with a sheave mounted on the cover, FIG. 7 a separate representation of the housing part of the viscous coupling, FIG. 8 a separate, perspective representation of an actuator of the viscous coupling, FIG. 9 the actuator housing of the viscous coupling with an electric actuator arranged therein, mounted on the housing part, FIG. 10 a perspective representation of a first further development of the pot-shaped base body with an annular magnetic insulator provided on the base body, FIG. 11 a cross sectional view of the base body of FIG. 10, FIGS. 12,13 a second further development of the viscous coupling, in which the holding chamber is furnished with venting holes, FIGS. 14-19 further variants of the viscous coupling according to the invention.

DETAILED DESCRIPTION

Figure 1:
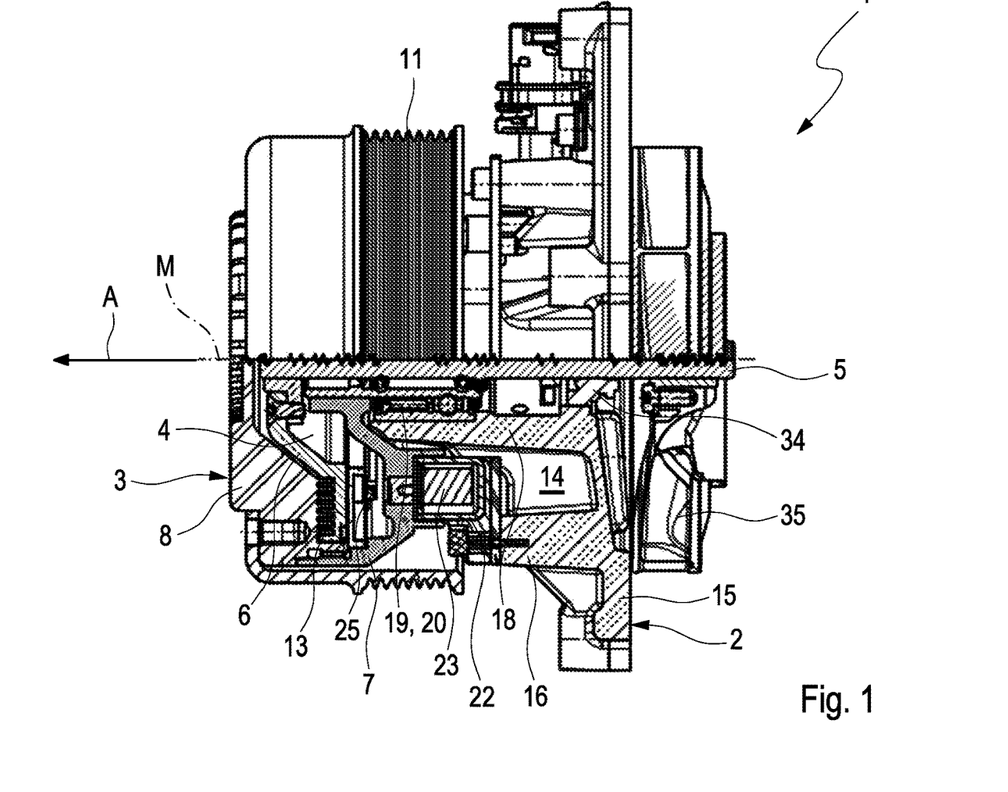
Figure 2:
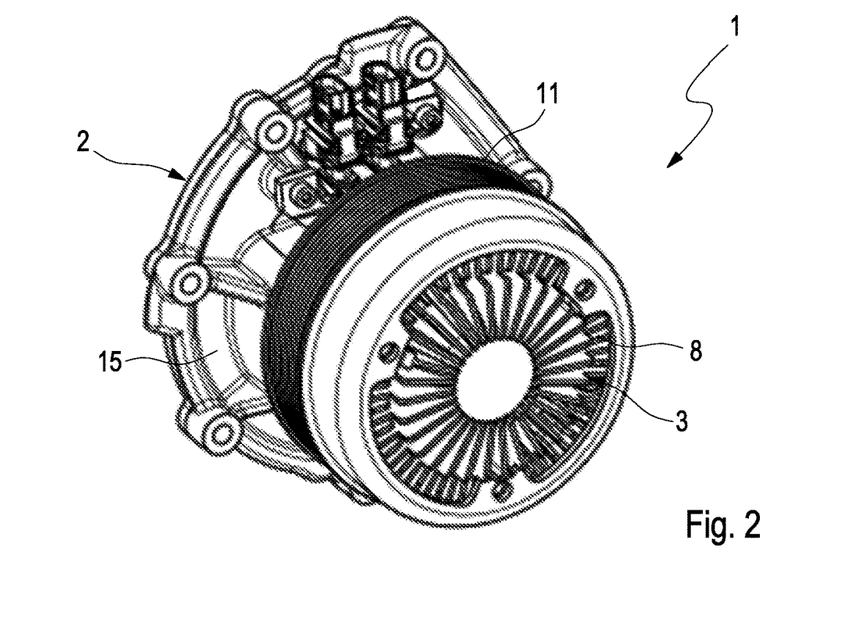

FIG. 1 illustrates a longitudinal cross section through an example of a viscous coupling 1 according to the invention for a coolant pump. FIG. 2 shows a perspective representation of the viscous coupling 1 of FIG. 1.

Viscous coupling 1 comprises a housing part 2 and an input body 3 which is rotatable relative to housing part 2. Together with housing part 2, input body 3 delimits an interior space 4 of the viscous coupling 1. The viscous coupling 1 further comprises a shaft 5 which is rotatable relative to the housing part 2, and on which an output body 6 is provided for conjoint rotation. A pump impeller 35 by means of which the coolant pump is able to circulate a coolant, for example water, is also attached to the shaft 5 and rotates conjointly therewith. The output body 6 may also be displaced rotationally relative to the input body 3 to create the coupling 1.

An axial direction A of the shaft 5 is defined by a central longitudinal axis M. A region between the shaft 5 and the housing part 2 is sealed with a sealing means, for example in the form of a slide ring seal 34. The purpose of the slide ring seal 34 is to minimise penetration of the region between the shaft 5 and the housing part 2 by coolant. However, since it is not possible to complete prevent all leakage of coolant through the slide ring seal 34 when the coupling 1 is in operation for a long period, a holding chamber 14 is provided in addition to the slide ring seal 34 on the housing part 2 and is able to at least temporarily hold leaked coolant which does succeed in getting into the region between the shaft 5 and the housing part 2 despite the presence of the slide ring seal 34.

FIG. 1 indicates that a coupling region 13 is formed between the output body 6 and the input body 3, in which a viscous fluid (not shown) is present for coupling between the input body 3 and the output body 6.

Figure 7:
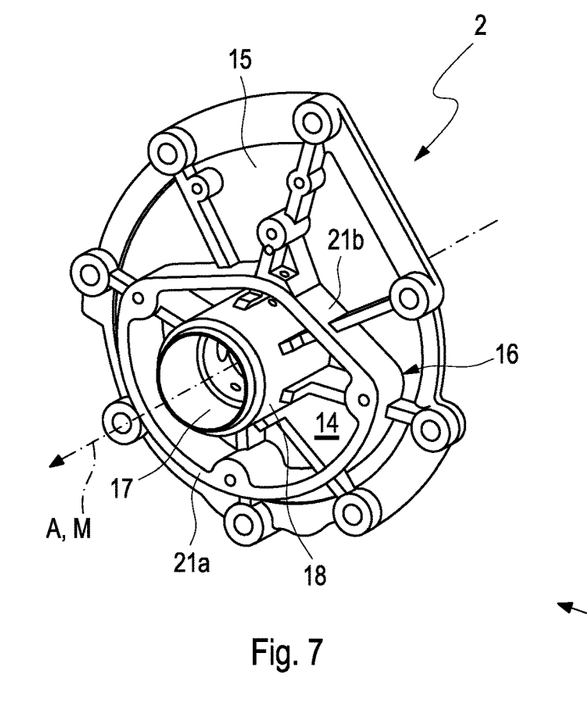

FIG. 7 shows the housing part 2 in a separate illustration. According to FIG. 7, the housing part 2 is constructed substantially as a housing plate 15, which delimits the interior space 4 (see also FIG. 1 in this regard) in the axial direction A of shaft 5. A housing wall 16 is conformed integrally with housing part 2 and partially delimits the holding chamber 14. The housing wall 16 protrudes away from the housing plate 15 in the axial direction A of shaft 5 towards input body 3, thereby forming a radially outward limit to the holding chamber 14.

The housing part 2 and the housing plate 15 includes an opening 17 which the shaft 5 passes through as shown in FIG. 1. A bearing collar 18 which surrounds the opening 17 and on which the shaft 5 is mounted rotatably by means of a bearing device 19, which may be embodied as a two-ring bearing 20, protrudes away from the housing part 2 and the housing plate 15 in axial direction A. The bearing collar 18 forms the radially inward limit of the holding chamber 14. The previously described slide ring seal 34 is also arranged between the shaft 5 and the bearing collar 18 (see FIG. 1 in this respect).

In the following section, the structural design of the holding chamber 14 on the housing part 2 will be explained in detail with reference to FIGS. 7 to 9.

According to FIG. 7, the housing wall 16 has a first wall section 21a, which when viewed from above along axial direction A has the geometry of a circle segment. A second wall section 21b, which mates with the first wall section 21a to form the housing wall 16 is curved. In variants of the example, other geometries for the first wall section 21a are also conceivable.

Figure 8:
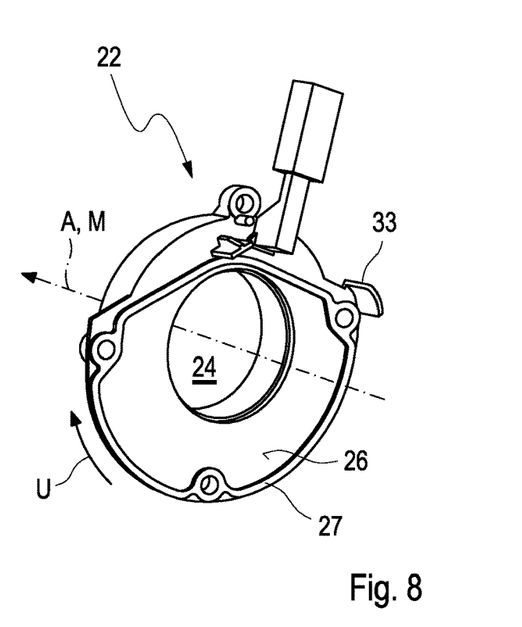

FIG. 8 is a perspective representation of an actuator housing 22 of viscous coupling 1, in which an electric actuator (not shown) is arranged. The electric actuator may be used to adjust a degree of coupling between the input body 3 and the output body 6. For this purpose, the electric actuator comprises an electric coil 23, which is only indicated schematically in FIG. 1. The electric coil 23 may serve to shift a valve lever 25, which is also only indicated schematically in FIG. 1, by reciprocal magnetic action. The effective flow cross section of a fluid line, which is not shown in greater detail in the figures, but via which the viscous fluid may be introduced into the coupling region 13, is varied in known manner by means of the valve lever 25. This in turn entails a variation of the degree of coupling between the input body 3 and the output body 6 by the viscous fluid which is introduced into the coupling region 13. The more viscous fluid there is between the to bodies in the coupling region, the higher is the degree of coupling attained.

When viewed from above along axial direction A, the actuator housing 22 is substantially annular in shape with a through opening 24. The coil winding (not shown) of the electric coil 23 extends in circumferential direction U around the through opening 24.

Figure 9:
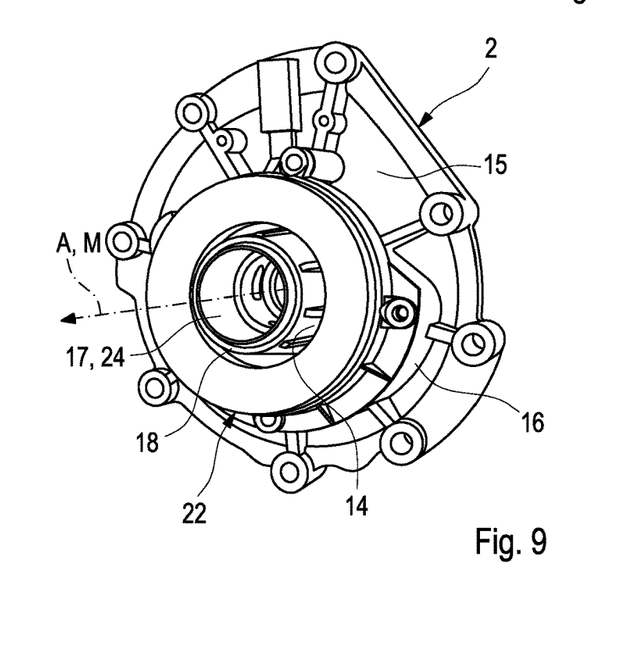

FIG. 9 shows the actuator housing 22 with the electric actuator in a mounted state on housing part 2. As is shown in FIG. 9, the actuator housing 22 partially covers the holding chamber 14 in the axial direction, wherein the chamber is delimited by the housing wall 16. The housing part 2 and the actuator housing 22 delimit the holding chamber 14 in axial direction A and are positioned opposite each other in axial direction A.

As is illustrated in FIG. 8, a sealing structure 27 may be formed on a side 26 of the actuator housing 22 facing housing part 2. The sealing structure 27 serves to seal the holding chamber 14 off from the external environment of the viscous coupling 1. The sealing structure 27 has the same contour in a cross section perpendicular to the axial direction A as the contour of the housing wall 16 that protrudes axially from the housing part 2.

Now if one considers the lengthwise cross section of FIG. 1 again, it is noticeable that the input body 3 comprises a pot-shaped base body 7 and a cover 8, which closes off the base body 7 which is arranged between the housing part 2 and the cover 8 relative to the axial direction A.

Figure 3:
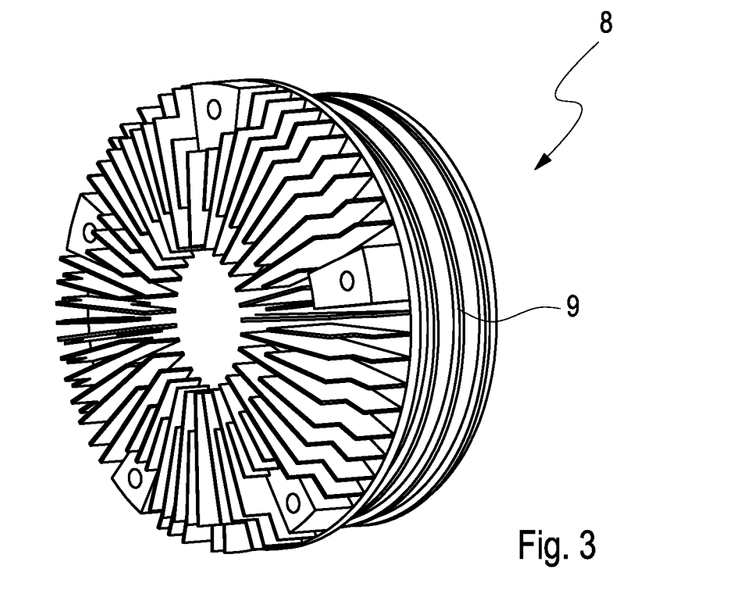
Figure 4:
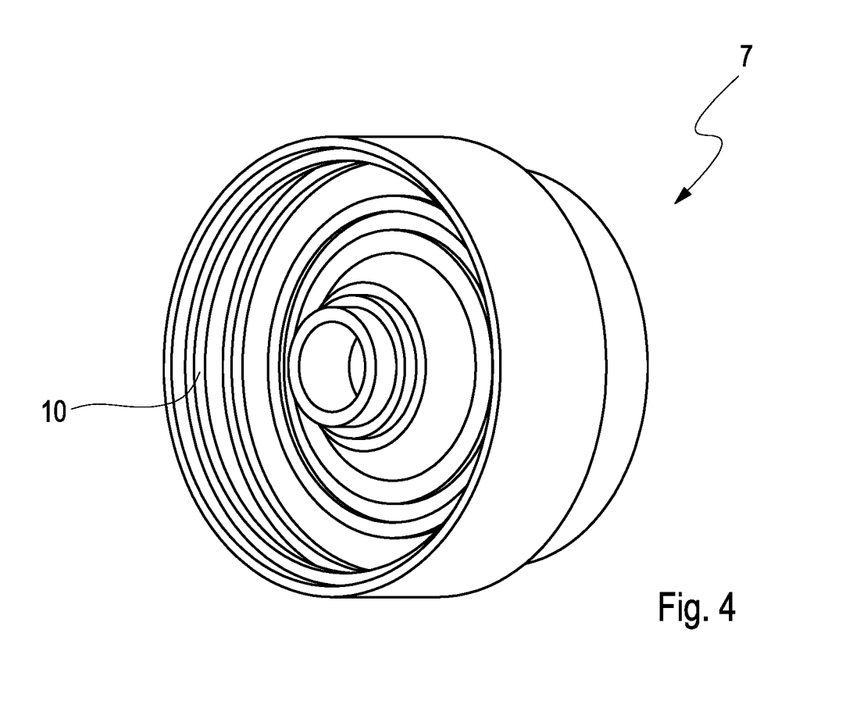
Figure 5:
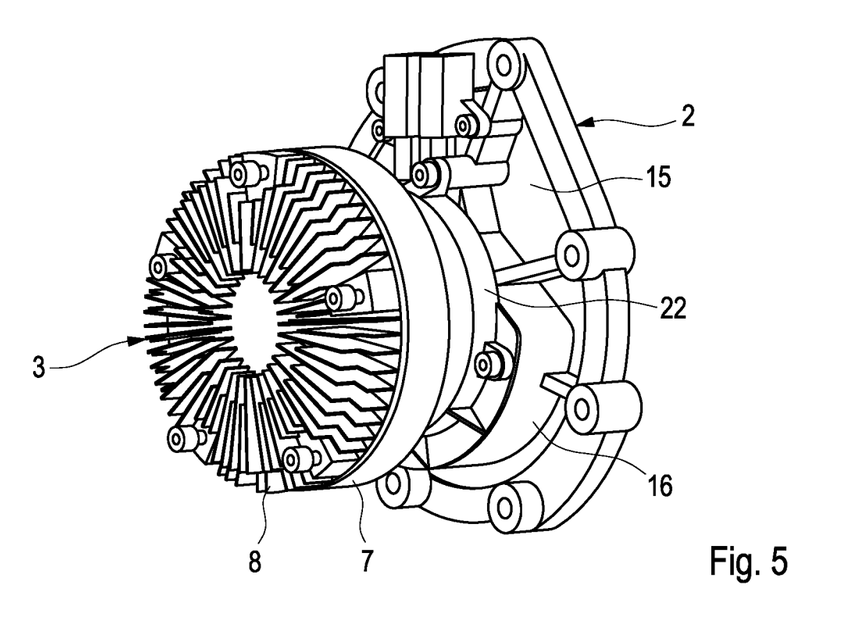

The input body 3 with the base body 7 and the cover 8 as well as the arrangement thereof on the housing part 2 will now be explained in greater detail with reference to the perspective illustrations in FIGS. 3 to 6. FIG. 3 shows the cover 8 separately, and FIG. 4 shows the pot-shaped base body 7 separately. FIG. 5 shows the cover 8 represented in FIG. 3 and the base body 7 represented in FIG. 4 mounted on the housing part 2.

Cover 8 is shown to have an external thread 9 conformed thereon, by means of which the cover may be screwed into a mating internal thread 10 provided on the base body 7. In the example of the figures, the cover 8 is made of aluminium and the base body 7 is made from a steel.

Figure 6:
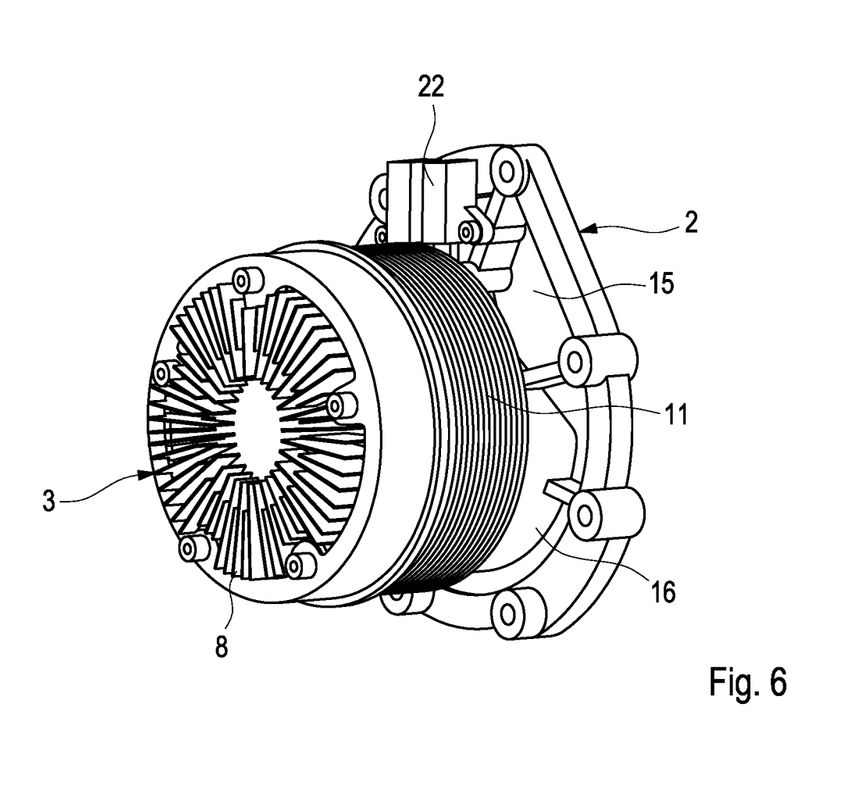

FIG. 6 shows a further development of the coupling 1 according to FIG. 5, in which a sheave 11 is screwed detachably onto the cover 8 in order to transmit an external turning moment radially outwardly. In a variant, such a sheave 11 may also be conformed radially outwardly and integrally with base body 7 (not shown in the figures).

Figure 10:
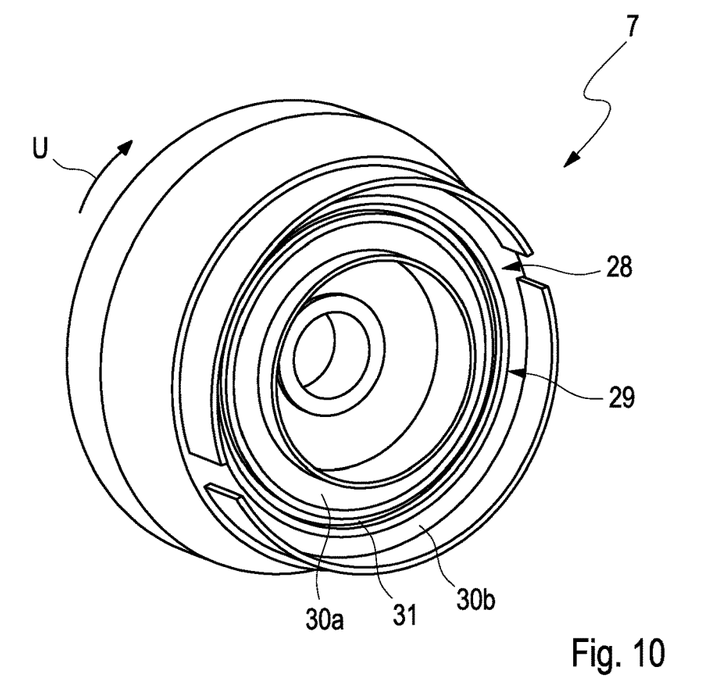
Figure 11:
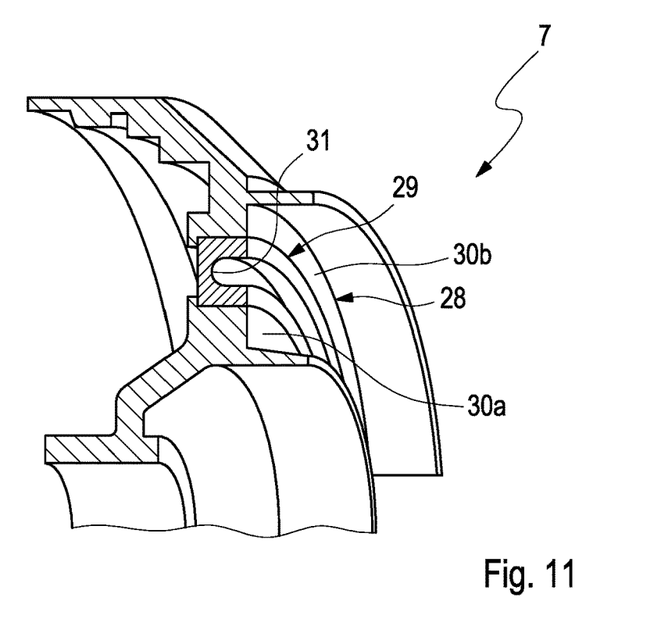

FIGS. 10 and 11 show a further development of the pot-shaped base body 7. According to this further development, an annular magnetic insulator 29 made from a stainless steel and running in circumferential direction U around pot bottom 28 is arranged on a pot bottom 28 of the pot-shaped base body 7. The magnetic insulator 29 serves to limit the effect of the magnetic field generated by the electric coil 23 spatically in the direction of the valve lever 25. The magnetic insulator 29 divides the pot bottom 28 into a radially inner and a radially outer bottom part 30a, 30b. The magnetic insulator 29 is preferably connected to the two base parts 30a, 30b via a laser weld joint. The magnetic insulator 29 may be a deep-drawn sheet metal formed part or a component turned from a blank. As FIGS. 10 and 11 illustrate clearly, a load relieving groove 31 running around the entire circumference inside the magnetic insulator 29, by means of which mechanical stresses in the annular magnetic insulator 29 may be reduced.

Figure 12:
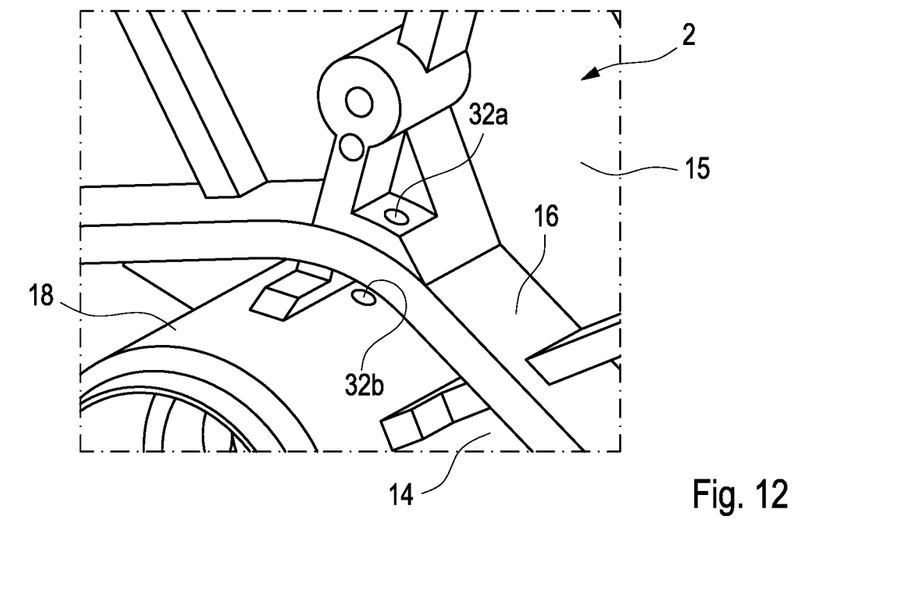
Figure 13:
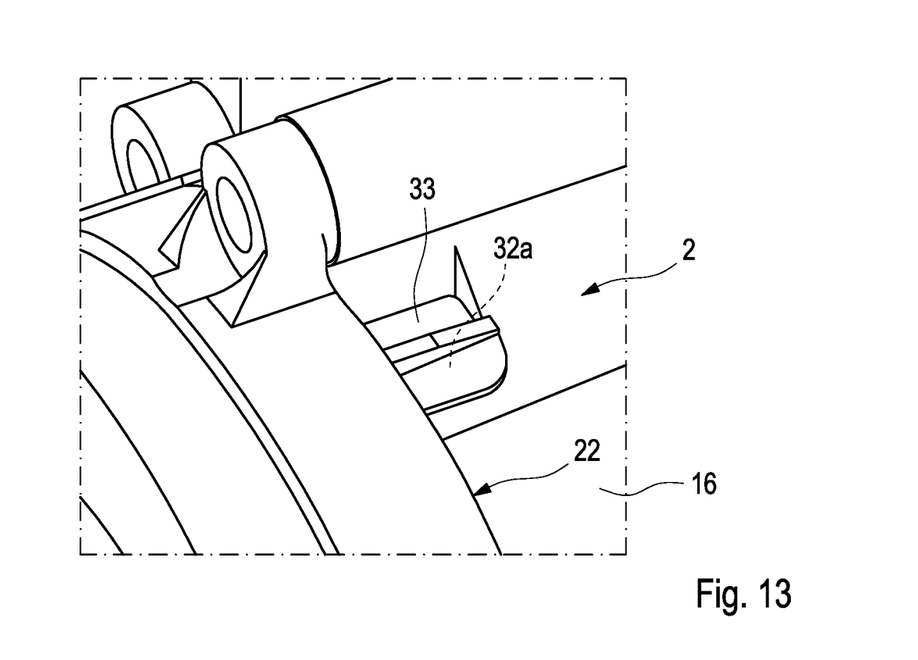

FIGS. 12 and 13 show another further development of coupling 1, in which a first through hole 32a is provided in the housing wall 16 to function as an external venting means for the holding chamber 14. In addition, a second through hole 32b is provided in the bearing collar 18 to function as an internal venting means for the holding chamber 14. In order to seal the external venting means, that is to say the first through hole 32a, when the viscous coupling 1 is in operation, a finger-like extension 33 protruding axially away from the actuator housing 22 may be provided on the actuator housing 22 to close the first through hole 32a.

Figure 14:
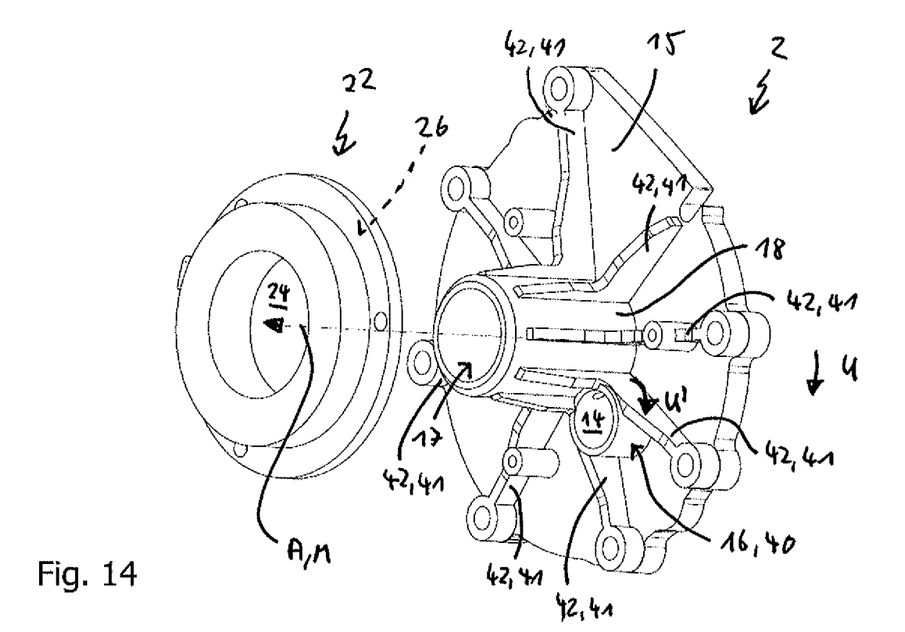
Figure 15:
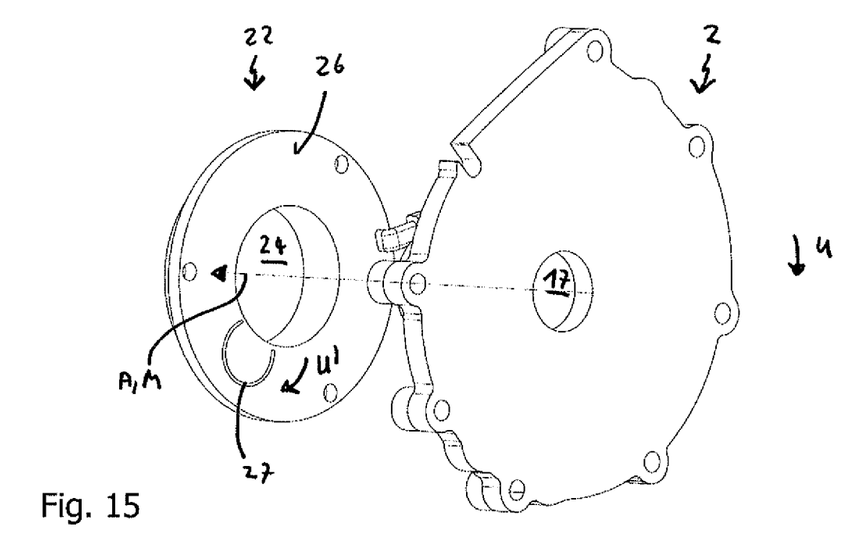

FIGS. 14 and 15 show perspective views of a further variant of the viscous coupling 1. In this variant, the housing wall 16 is embodied as a peripheral wall 40. As shown in FIG. 14, the peripheral wall 40 may have a round, preferably circular geometry in a cross section perpendicular to the axial direction A. In the variant of FIGS. 14 and 15, the housing wall 16 embodied as a peripheral wall 40 completely delimits the holding chamber 14 along in the peripheral direction U' of the housing wall 16.

As FIG. 14 further shows, a rib structure 41 comprising a plurality of radially extending ribs 42 protrudes from housing part 2 embodied as housing plate 15, in the axial direction A. The ribs 42 are arranged at a distance from each other in the circumferential direction U. As shown in FIG. 14, the ribs 42 are preferably arranged equidistantly from each other with respect to the the circumferential direction U. In the variant according to FIGS. 14 and 15, the peripheral wall 40 or the housing wall 16 is arranged between two ribs 42 that are adjacent to each other in circumferential direction U.

As may be seen in the illustration of FIG. 15, the sealing structure 27 on the side 26 of the actuator housing 22 facing the housing part 2 may be sprayed on. Alternatively, the sealing structure 27 may be a sealing ring, for example an O-ring made from an elastic material or alternatively a sealing plug.

Figure 16:
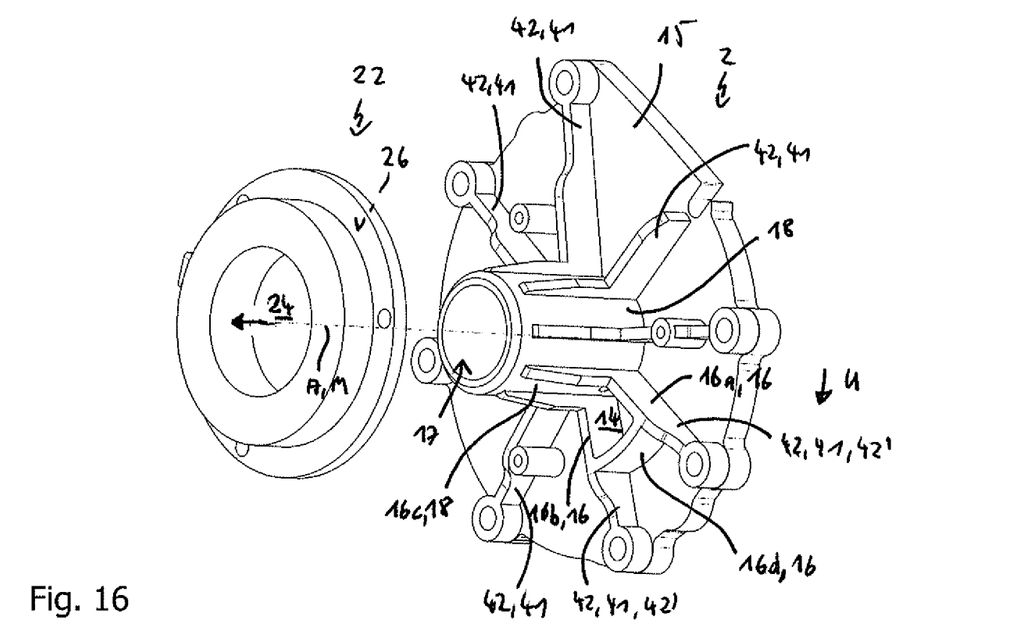
Figure 17:
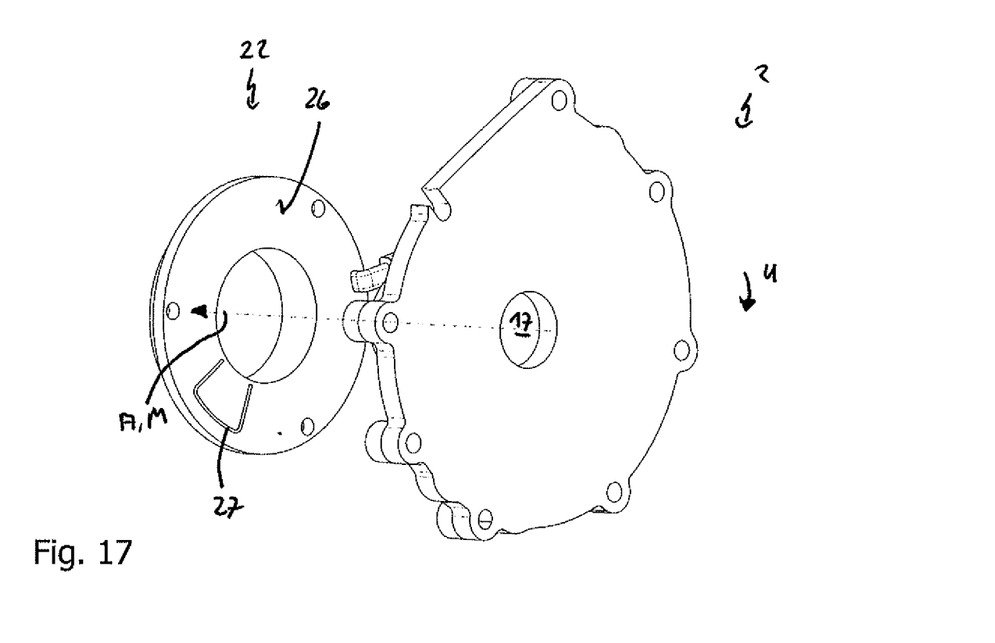

FIGS. 16 and 17 show perspective views of an alternative variant of the example of FIGS. 14 and 15. In this variant, the rib structure 41 as shown in FIG. 16 forms a part of the housing wall 16. Two ribs 42—additionally identified in FIG. 16 with reference numeral 42'—adjacent to each other in circumferential direction U and extending radially away from the bearing collar 18 each form a housing wall section 16a, 16b of the housing wall 16. The bearing collar 18 forms a housing wall section 16c that delimits the holding chamber 14 radially inwardly. The three housing wall sections 16a, 16b, 16c are complemented by a radially outer housing wall section 16d, which is located opposite the radial inner housing wall section 16c, to form housing wall 16. In this variant as well, the sealing structure 27 on the side 26 of the actuator housing 22 facing the housing part 2 may be sprayed on. In this case, the sealing structure 27 is arranged axially between the three housing wall sections 16a, 16b and 16d.

Figure 18:
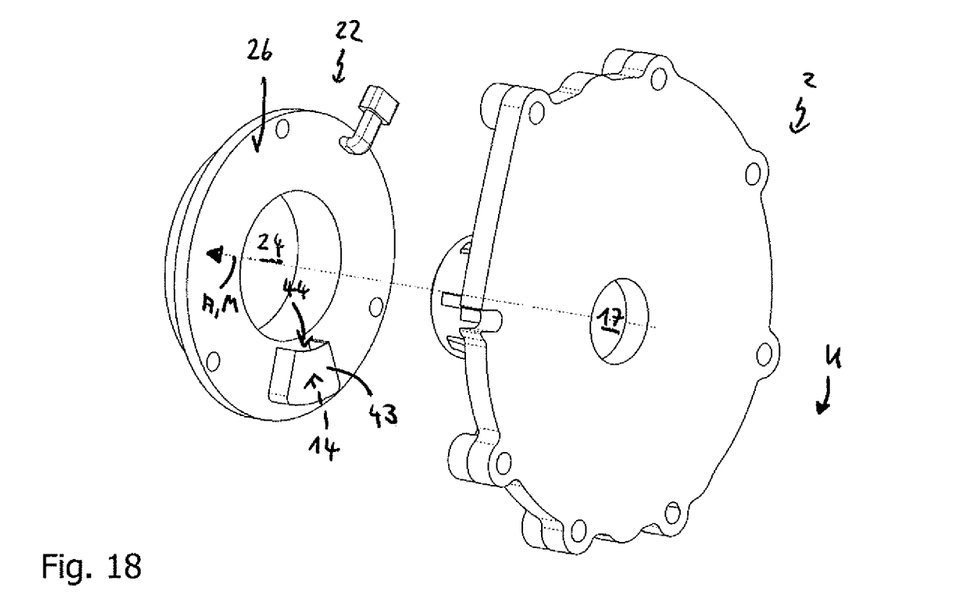
Figure 19:
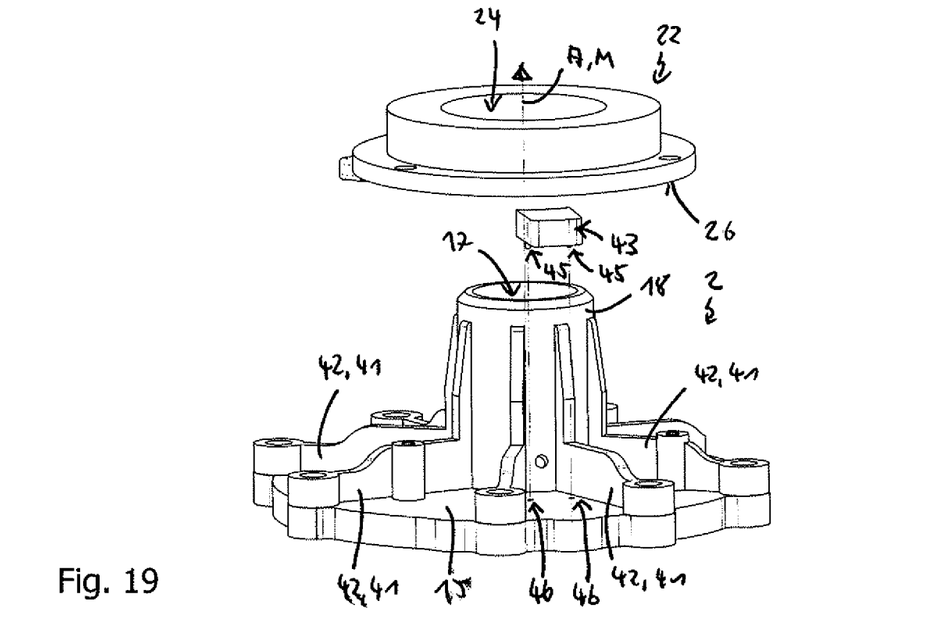

FIGS. 18 and 19 show perspective of two further alternative variants of the viscous coupling. In the example of FIG. 18, the holding chamber 14 is delimited by a reservoir 43 which is conformed integrally with the actuator housing 22 and on the side 26 thereof facing the housing part 2. As is evident from FIG. 18, the receptacle 43 is designed so that it is open radially inwardly, that is to say towards the bearing collar 18. In an assembled state of the viscous coupling, this radially inwardly open side 44 of the receptacle 43 is closed by the bearing collar 18.

FIG. 19 shows a variant of the example of FIG. 18. The example of FIG. 19 differs from that of FIG. 18 in that here the receptacle 43 is embodied as a separate component, which in the assembled state of viscous coupling 1 is clamped between housing part 2 or housing plate 15 and the actuator housing 22. In order to secure the receptacle 43 more effectively, outwardly protruding projections 45 may be provided thereon, and engage in matching recesses which in the assembled state of viscous coupling 1 are present (not shown) on housing part 2 or housing plate 15 and/or on the actuator housing 22.

The invention claimed is:

1. A viscous coupling for a coolant pump, comprising:
    a housing part and an input body rotatable relative to the housing part, the housing part and the input body at least partially delimiting an interior space;
    a shaft that is rotatable relative to the housing part and on which an output body arranged in the interior space is formed for conjoint rotation with the shaft;
    a coupling region formed between the output body and the input body, the coupling region configured to hold a viscous fluid to assure a coupling between the input body and the output body;
    a holding chamber for collecting coolant leaking from the coolant pump;

a housing wall conformed integrally with the housing part, the housing wall partially delimiting the holding chamber; and an actuator housing and an electric actuator therein by which a degree of coupling between the input body and the output body is adjustable;

wherein the actuator housing at least partially covers the holding chamber; and wherein the housing part has an opening through which the shaft passes, wherein a bearing collar surrounding the opening protrudes in an axial direction of the shaft away from the housing part, and the bearing collar is rotatably mounted on the shaft and delimits the holding chamber radially inwardly.

2. The viscous coupling according to claim 1, wherein the housing part is a housing plate delimiting the interior space in an axial direction of the shaft, wherein the housing wall protrudes away from the housing plate in the axial direction such that the housing wall radially outwardly delimits the holding chamber.

3. The viscous coupling according to Claim 1, wherein at least one of:
a first through hole is provided in the housing wall to form an outer vent; and
a second through hole is provided in the bearing collar to form an inner vent.

4. The viscous coupling according to claim 3, further comprising an extension protruding in the axial direction on the actuator housing and closing the first through hole.

5. The viscous coupling according to claim 1, wherein, in a view along the axial direction, the actuator housing has a geometry of an annular body and is formed with a through hole through which the shaft passes, wherein the electric actuator includes an electric coil having a coil winding extending circumferentially around the through hole.

6. The viscous coupling according to claim 1, further comprising a sealing structure formed on a side of the actuator housing facing the housing part to seal the holding chamber off from an external environment.

7. The viscous coupling according to claim 6, wherein the sealing structure is sprayed onto the actuator housing.

8. The viscous coupling according to claim 6, wherein the sealing structure is embodied as a sealing ring, and is made from an elastic material, or is embodied as a sealing plug.

9. The viscous coupling according to claim 1, wherein the housing wall has a first wall section, which has a geometry of a circle segment in a cross section perpendicular to the axial direction, and a second wall section, which mates with the first wall section to form the housing wall and is curved.

10. The viscous coupling according to claim 1, wherein the input body is constructed in at least two parts including a pot-shaped base body and a cover which closes the base body, the base body arranged in the axial direction between the housing part and the cover, wherein an external thread is formed on the cover, and by which the cover is screwed into a mating internal thread provided on the base body.

11. The viscous coupling according to claim 10, wherein the cover is made from aluminium, and the base body is made from a steel.

12. The viscous coupling according to claim 10, further comprising a sheave that is one of: (i) attached to the cover by a threaded connection for conjoint rotation therewith to transfer an external turning moment radially outwards, or (ii) conformed integrally on the base body to transfer the external turning moment radially outwards to the base body.

13. The viscous coupling according to claim 10, further comprising an annular magnetic insulator made from a stainless steel arranged on a pot bottom of the pot-shaped base body, extending in a circumferential direction of the pot bottom, dividing the pot bottom into a radially inner and a radially outer bottom part, and connected to the two bottom parts via a laser weld joint.

14. The viscous coupling according to claim 13, wherein the annular magnetic insulator is a deep-drawn sheet metal formed part or a component turned from a blank.

15. The viscous coupling according to claim 13, further comprising a load relieving groove conformed inside the magnetic insulator and that runs around an entire circumference thereof.

16. The viscous coupling according to claim 1, wherein the housing wall is embodied as a peripheral wall and has a round geometry in a cross section perpendicular to the axial direction.

17. The viscous coupling according to claim 16, wherein the housing wall delimits the holding chamber along a circumferential direction.

18. The viscous coupling according to claim 1, further comprising a rib structure having ribs and that protrudes away from the housing part in the axial direction, wherein the housing wall, is arranged between two adjacent ribs, or wherein the rib structure forms a part of the housing wall.

19. A coolant pump for circulating a coolant, comprising:
a viscous coupling having:
a housing part and an input body rotatable relative to the housing part, the housing part and the input body at least partially delimiting an interior space;
a shaft that is rotatable relative to the housing part and on which an output body arranged in the interior space is formed for conjoint rotation with the shaft;
a coupling region formed between the output body and the input body, the coupling region configured to hold a viscous fluid to assure a coupling between the input body and the output body;
a holding chamber for collecting coolant leaking from the coolant pump;
a housing wall conformed integrally with the housing part, the housing wall partially delimiting the holding chamber; and
an actuator housing and an electric actuator therein by which a degree of the coupling between the input body and the output body is adjustable; and
moving blades arranged on the shaft for conjoint rotation therewith to circulate the coolant;
wherein the actuator housing at least partially covers the holding chamber; and
wherein the input body is constructed in at least two parts including a pot-shaped base body and a cover which closes the base body, the base body arranged in the axial direction between the housing part and the cover, wherein an external thread is formed on the cover, and by which the cover is screwed into a mating internal thread provided on the base body.

* * * * *